United States Patent
Chen

(10) Patent No.: US 9,438,034 B2
(45) Date of Patent: Sep. 6, 2016

(54) TRANSIENT VOLTAGE SUPPRESSOR

(71) Applicant: NANYA TECHNOLOGY CORPORATION, Taoyuan (TW)

(72) Inventor: Wei-Fan Chen, Taoyuan County (TW)

(73) Assignee: NANYA TECHNOLOGY CORPORATION, Taoyuan (TW)

( * ) Notice: Subject to any disclaimer, the term of this patent is extended or adjusted under 35 U.S.C. 154(b) by 27 days.

(21) Appl. No.: 14/155,370

(22) Filed: Jan. 15, 2014

(65) Prior Publication Data

US 2015/0200539 A1    Jul. 16, 2015

(51) Int. Cl.
| H02H 9/00 | (2006.01) |
| H02H 9/04 | (2006.01) |
| H02H 3/20 | (2006.01) |
| H02H 3/22 | (2006.01) |

(52) U.S. Cl.
CPC ..................... *H02H 9/046* (2013.01)

(58) Field of Classification Search
CPC ........................................ H02H 9/046
USPC .......................................... 361/56
See application file for complete search history.

(56) References Cited

U.S. PATENT DOCUMENTS

| 5,640,299 | A  * | 6/1997  | Leach ............................ 361/56 |
| 7,030,447 | B2 * | 4/2006  | Robb .................... H01L 27/0623 257/360 |
| 7,579,632 | B2   | 8/2009  | Salih et al. |
| 8,315,024 | B2 * | 11/2012 | Russ et al. ...................... 361/56 |
| 2001/0025963 | A1   | 10/2001 | Tashiro et al. |
| 2005/0122644 | A1 * | 6/2005  | Ma ...................... H01L 27/0259 361/56 |
| 2010/0277842 | A1   | 11/2010 | Chuang |
| 2012/0025350 | A1 * | 2/2012  | Lin et al. ...................... 257/546 |
| 2012/0068299 | A1 * | 3/2012  | Lin et al. ...................... 257/510 |
| 2013/0003242 | A1   | 1/2013  | Lin et al. |

FOREIGN PATENT DOCUMENTS

| TW | 200611395 | 4/2006 |
| TW | 200644735 | 12/2006 |
| TW | 200922067 | 5/2009 |
| TW | 201015703 | 4/2010 |

OTHER PUBLICATIONS

"Office Action of Taiwan Counterpart Application", issued on May 15, 2015, p. 1-p. 3.

* cited by examiner

*Primary Examiner* — Thienvu Tran
*Assistant Examiner* — Lucy Thomas
(74) *Attorney, Agent, or Firm* — Jianq Chyun IP Office

(57) ABSTRACT

The invention provides a voltage regulator including a transient voltage suppressor. The transient voltage suppressor includes N first transistors and N semiconductor units. The N first transistors are coupled between a reference ground and N pads respectively, and the N transistors are controlled by a voltage on a reference power line. The N semiconductor units are coupled between the reference ground and the N pads respectively, or coupled between the reference power line and the N pads respectively. N is a positive integer.

10 Claims, 5 Drawing Sheets

TRANSIENT VOLTAGE SUPPRESSOR

BACKGROUND OF THE INVENTION

1. Field of Invention

The present invention generally relates to a transient voltage suppressor.

2. Description of Prior Art

Along with the rapid development of science and technology at the present, integrated circuits are widely used in an electronic apparatus. A person skilled in the art knows that Electrostatic discharge (ESD) is one of main problems for the integrated circuits. Circuits of the integrated circuit may be reset or even damaged under ESD events. Currently, all consumer electronics are expected to pass the ESD test requirement of IEC 61000-4-2 standard by applying suitable protection scheme on the consumer electronics.

Referring to FIG. 1A and FIG. 1B, wherein FIG. 1A and FIG. 1B are block diagrams of an electronic apparatus which working in different modes. In FIG. 1A, a transient voltage suppressor 100 (TVS) is coupled to the circuit to be protected 120 in parallel. The circuit to be protected 120 is working in normal mode, and voltage levels of the operating voltage VPP and reference ground GND respectively keep in normal ranges. The TVS 110 sense the voltage levels of the operating voltage VPP and reference ground GND, and provides a high impendence between the operating voltage VPP and reference ground GND. Such as that, a current IOP can be provided to the circuit to be protected 120 for operating.

On the other hand, when a ESD event occurs, referring to FIG. 1B, the TVS 110 sense the voltage levels of the operating voltage VPP and reference ground GND, and provides a very low impendence between the operating voltage VPP and reference ground GND. Such as that, a current IESD caused by the ESD event can be discharged to the reference ground GND, and the circuit to be protected 120 is protected from damaged by the current IESD.

SUMMARY OF THE INVENTION

The present invention provides a transient voltage suppressor for protect a circuit damaged by electrostatic discharge (ESD).

The transient voltage suppressor includes N first transistors and N semiconductor units. The N first transistors are coupled between a reference ground and N pads respectively, and the N transistors are controlled by a voltage on a reference power line. The N semiconductor units are coupled between the reference ground and the N pads respectively, or coupled between the reference power line and the N pads respectively. N is a positive integer.

In an embodiment of the disclosure, each of the semiconductor units is a diode, wherein, a cathode of each of the diodes is coupled to the corresponding pad, and an anode of the each of the diodes is coupled to the reference ground, N is a positive integer.

In an embodiment of the disclosure, the semiconductor units are respectively N second transistors, and the second transistors are coupled between the N pads respectively and the reference power line, the second transistors are controlled by the reference ground.

In an embodiment of the disclosure, the transient voltage suppressor further includes a power clamp circuit. The power clamp circuit is coupled between the reference power line and the reference ground. The power clamp circuit drains a current from the reference power line to the reference ground when the transient voltage suppressor is operated in an electrostatic discharge (ESD) protection mode.

In an embodiment of the disclosure, wherein the power clamp circuit includes a clamp transistor. The clamp transistor has a first end, a second end and a control end. The first end of the clamp transistor is coupled to the control end of the clamp transistor and the reference power line, the second end of the clamp transistor is coupled to the reference ground.

In an embodiment of the disclosure, wherein the clamp transistor is a NPN bipolar transistor, the first end of the clamp transistor is an emitter of the clamp transistor, the second end of the clamp transistor is a collector of the clamp transistor, and the control end of the clamp transistor is a base of the clamp transistor.

In an embodiment of the disclosure, wherein the power clamp circuit includes a clamp transistor. The clamp transistor has a first end, a second end and a control end. The first end of the clamp transistor is coupled to the control end of the clamp transistor and the reference ground, the second end of the clamp transistor is coupled to the reference power line.

In an embodiment of the disclosure, wherein the clamp transistor is a PNP bipolar transistor, the first end of the clamp transistor is an emitter of the clamp transistor, the second end of the clamp transistor is a collector of the clamp transistor, and the control end of the clamp transistor is a base of the clamp transistor.

In an embodiment of the disclosure, wherein the power clamp circuit further includes an extra clamp transistor. The extra clamp transistor is coupled between the base and the collector of the clamp transistor. The extra clamp transistor has a first end, a second end and a control end, the first end of the extra clamp transistor is coupled to the control end of the clamp transistor, the control end and the second end of the extra clamp transistor are coupled to the reference ground.

In an embodiment of the disclosure, wherein the extra clamp transistor is a NPN bipolar transistor, the first end of the clamp transistor is an collector of the extra clamp transistor, the second end of the clamp transistor is an emitter of the extra clamp transistor, and the control end of the extra clamp transistor is a base of the extra clamp transistor.

In an embodiment of the disclosure, wherein the power clamp circuit further includes at least one clamp diode. An anode of the clamp diode is coupled to the control end of the clamp transistor, and a cathode of the clamp diode is coupled to the reference ground.

In an embodiment of the disclosure, wherein the transistors are PNP bipolar transistors, each of the transistors has an emitter, a collector and a base, wherein the base of each of the transistors is coupled to the reference power line, the collector of each of the transistors is coupled to the reference ground, and the emitter of each of the transistors is coupled to the corresponding pad.

In an embodiment of the disclosure, wherein the pads comprises at least one input output pad, and a plurality of power pads.

The present disclosure provides to dispose a transistor connecting to a pad in the transient voltage suppressor. The transistor can be turned on when the pad receives a peak voltage caused by electrostatic discharge, and a peak current of the peak voltage can be drained to a reference ground rapidly. Such as that, by using the transient voltage suppressor according to the present disclosure, a core circuit can be protected from damaged by ESD.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
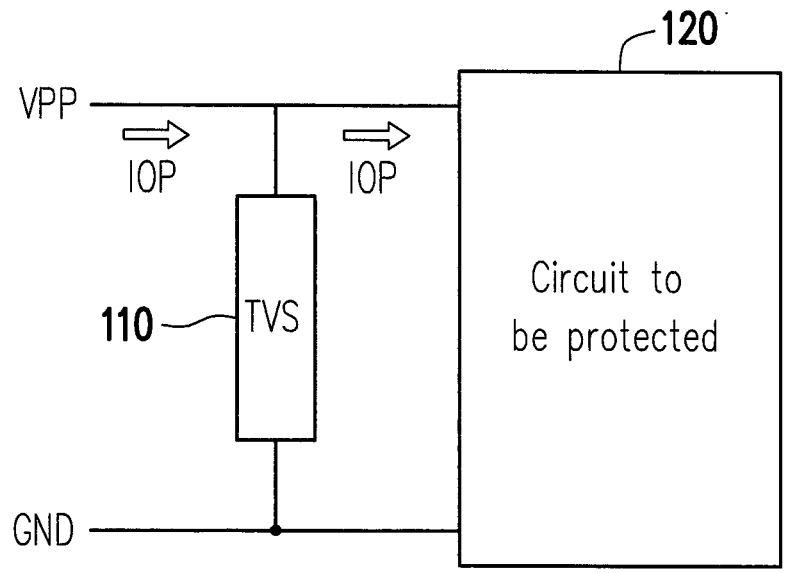
FIG. 1A and FIG. 1B are block diagrams of an electronic apparatus which working in different modes.
Figure 1B:
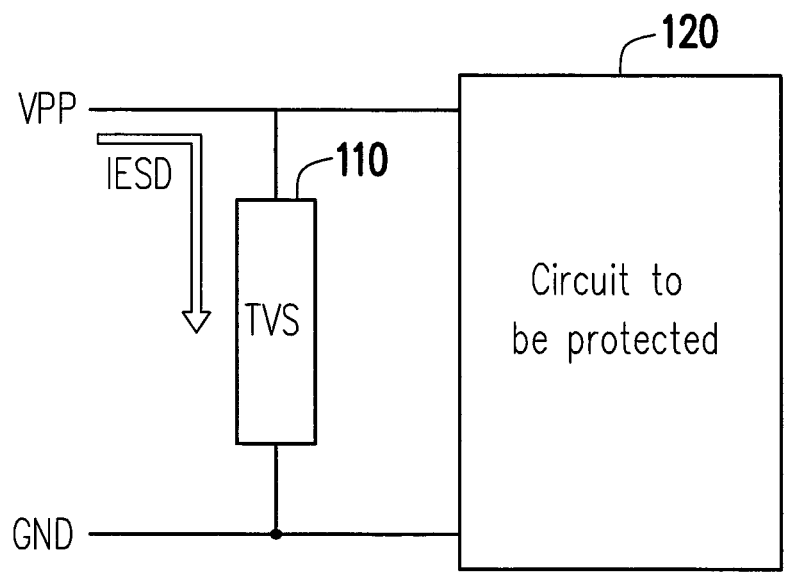

Reference will now be made in detail to the present preferred embodiment of the invention, examples of which are illustrated in the accompanying drawings. Wherever possible, the same reference numbers are used in the drawings and the description to refer to the same or like parts.

Figure 2A:
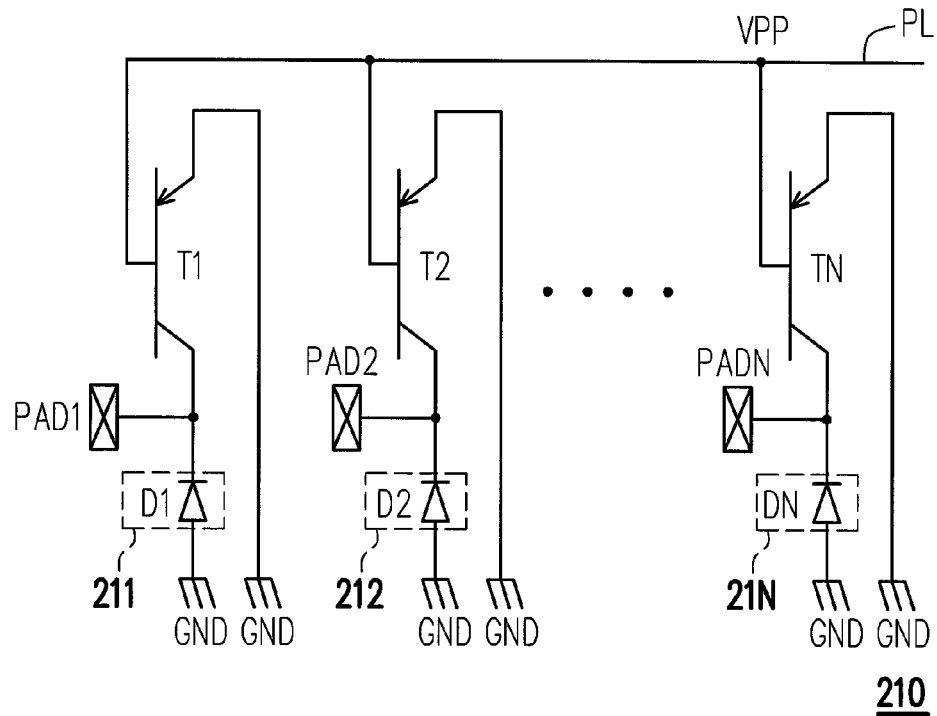
FIG. 2A-FIG. 2C are circuit diagrams of a transient voltage suppressor 210-230 according to an embodiment of the present disclosure.

Referring to FIG. 2A, FIG. 2A is a circuit diagram of a transient voltage suppressor 210 according to an embodiment of the present disclosure. The transient voltage suppressor (TVS) 200 includes N transistors T1-TN and N semiconductor units 210-2N0. In FIG. 2A, the semiconductor units 211-21N are respectively diodes D1-DN. The transistors T1-TN are coupled to the reference ground GND and the transistors T1-TN are respectively coupled to the pads PAD1-PADN. The transistors T1-TN are also coupled to the reference power line PL for receiving the operating voltage VPP. The semiconductor units 211-21N are respectively coupled to the pads PAD1-PADN, and the semiconductor units 211-21N are coupled to the reference ground GND.

In this embodiment, the diodes D1-DN are respectively coupled to the transistors T1-TN. In detail, the diodes D1-DN are respectively coupled to the connection ends which the transistors T1-TN respectively connecting to the pads PAD1-PADN.

Each of the transistors T1-TN has a first end, a second end, and a control end. The first ends of the transistors T1-TN are coupled to the reference ground GND, the second ends of the transistors T1-TN are respectively coupled to the pads PAD1-PADN, and the control ends of the transistors T1-TN are coupled to the reference power line PL. In this embodiment, the first ends of the transistors T1-TN are emitters of the transistors T1-TN, the second ends of the transistors T1-TN are collectors of the transistors T1-TN, and the control ends of the transistors T1-TN are bases of the transistors T1-TN. The transistors T1-TN are bipolar transistors, and in FIG. 2, the transistors T1-TN are PNP bipolar transistors. The cathodes of the diodes D1-DN are respectively coupled to the pads PAD1-PADN, and the anodes of the diodes D1-DN are coupled to the reference ground.

A circuit to be protected by the TVS 200 may be coupled to the TVS 200. In detail, each of the pads T1-TN may be coupled to pads of the circuit to be protected. One of the pads of the circuit to be protected may be coupled to one or more pads T1-TN of TVS 200.

In operation, when an ESD event is not occurred, voltage levels of the operating voltage VPP and the reference ground GND is kept within a normal range, and the transistors T1-TN and the diodes D1-DN are cut off. Accordingly, the TVS 200 provides high impendence between the reference power line PL and the pads PAD1-PADN, and between the pads PAD1-PADN and the reference ground GND. The signals transported to the pads PAD1-PADN can be transported to the circuit to be protected for normal operation.

On the other hand, when the ESD event is occurred, if an ESD voltage is transported to the pad PAD1 with a positive high voltage peak, the voltage level of the operating voltage VPP on the reference power line PL is raised to high by coupling the positive high voltage peak on pad PAD1. At this time, the transistor T1 is turned on according to the high voltage peak on pad PAD1, and the transistor T1 provides a very low impendence between the pad PAD1 and the reference ground GND. A current on the pad PAD1 may be drained to the reference ground GND, and the circuit to be protected is protected from damaged by the ESD event.

On the other hand, the semiconductor units 211-21N may be used to conduct paths between the pads PAD1-PADN and the reference power line PL or the reference ground GND when the ESD event is occurred. That is, the semiconductor units 210-2N0 may guide an ESD current from the pads PAD1-PADN to the reference ground GND or the reference power line PL.

Figure 2B:
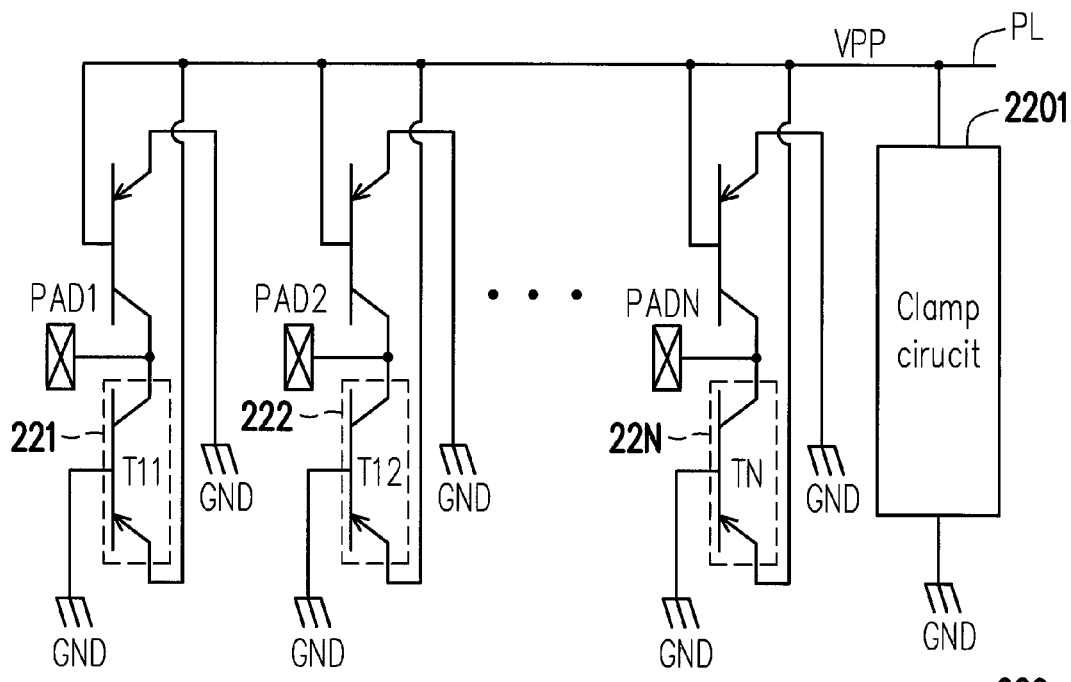

Referring to FIG. 2B, FIG. 2B is the other circuit diagram of a transient voltage suppressor 220 according to an embodiment of the present disclosure. Different from the transient voltage suppressor 210 in FIG. 2A, the semiconductor units 221-22N in the transient voltage suppressor 220 are respectively formed by transistors T11-T1N. The transistors T11-T1N are PNP type bipolar transistors. For example, a base of the transistor T11 is coupled to the reference ground GND, the emitter of the transistor T11 is coupled to the pad PAD1, and the collector of the transistor T11 is coupled to the reference power line PL. Furthermore, the transient voltage suppressor 220 further includes a clamp circuit 2201. The clamp circuit 2201 is coupled between the reference power line PL and the reference ground GND.

Figure 2C:
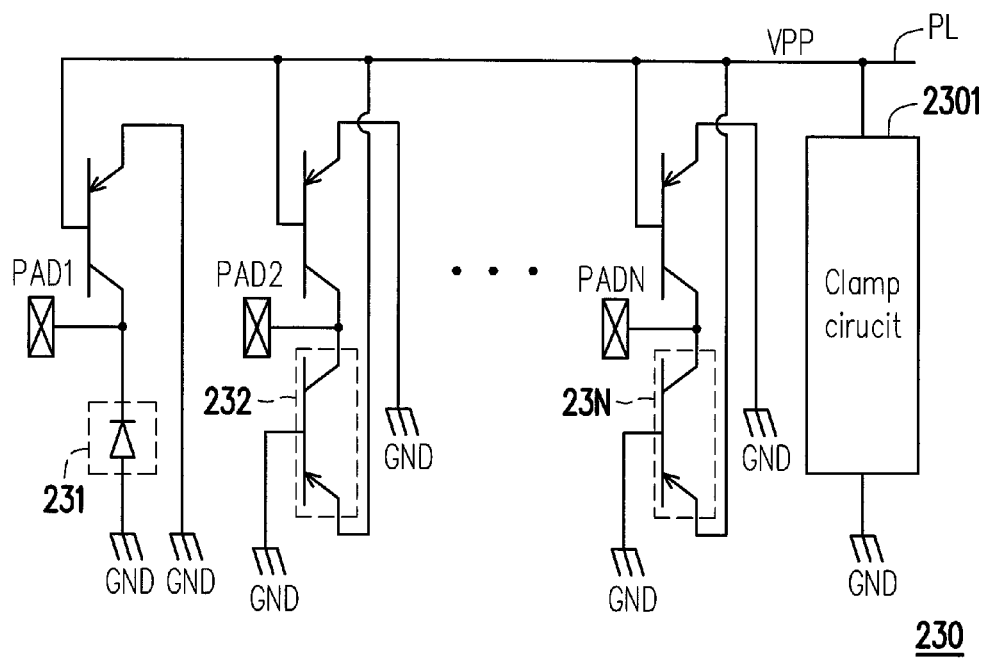

Referring to FIG. 2C, FIG. 2C is another circuit diagram of a transient voltage suppressor 230 according to an embodiment of the present disclosure. In the transient voltage suppressor 230, each of the semiconductor units 231-23N may be formed by a transistor or a diode. In FIG. 2C, the semiconductor unit 231 is formed by a diode such as the diode D1 in FIG. 2A, and the semiconductor units 232-23N are respectively formed by transistors such as transistors T12-T1N in FIG. 2B.

Figure 3:
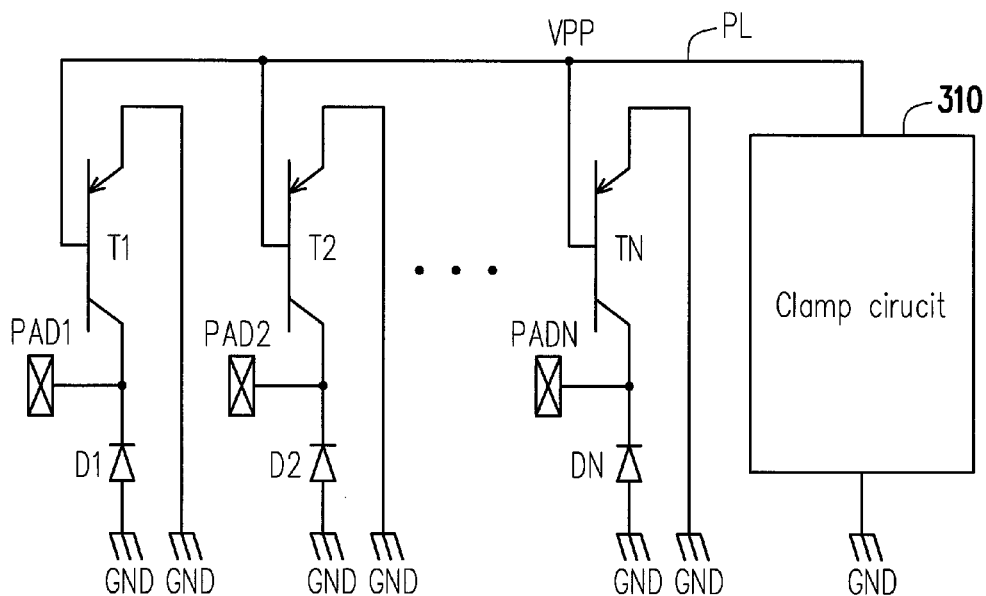
FIG. 3 is another circuit diagram of a transient voltage suppressor to an embodiment of the present disclosure.

Referring to FIG. 3, FIG. 3 is another circuit diagram of a transient voltage suppressor according to an embodiment of the present disclosure. The TVS 300 includes N transistors T1-TN, N semiconductor units 310-3N0 and a clamp circuit 310. The transistors T1-TN are coupled to the reference ground GND and the transistors T1-TN are respectively coupled to the pads PAD1-PADN. The transistors T1-TN are also coupled to the reference power line PL for receiving the operating voltage VPP. Furthermore, the clamp circuit 310 is coupled between the reference power line PL and the reference ground GND.

Please notice here, when the TVS is operated in an ESD protection mode, the clamp circuit 310 is used to drain a current from the reference power line PL to the reference ground GND. In detail, when an ESD voltage is transported to the pad PAD1 with a positive high voltage peak, a voltage level of the operating voltage VPP is raised by coupling the positive high voltage peak on pad PAD1. The clamp circuit 310 senses the raising of the voltage level of the operating voltage VPP and provide a low impendence between the reference power line PL and the reference ground GND. Such as that, the current caused by the ESD voltage is drained from the reference power line PL to the reference ground GND through the clamp circuit 310, and the circuit to be protected may be prevented from damaged by the ESD voltage.

On the other hand, each of the pads PAD1-PADN may be configured to a pad with different type. At least one of the pads PAD1-PADN may be input output (IO) pad, and some of the pads PAD1-PADN may be power pads. The power pads include VDD pad for coupling to an operating voltage, and ground pad for coupling to a ground voltage.

Figure 4A:
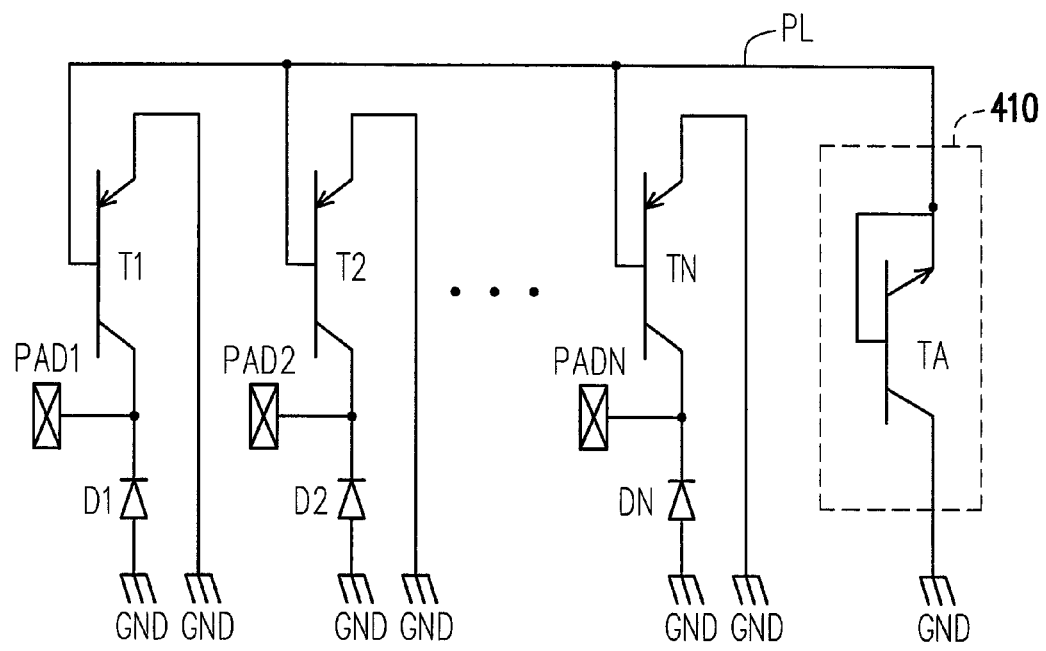
FIG. 4A-FIG. 4D are circuit diagrams of transient voltage suppressors according to a plurality of embodiments of the present disclosure.

Referring to FIG. 4A-FIG. 4D, FIG. 4A-FIG. 4D are circuit diagrams of transient voltage suppressors according to a plurality of embodiments of the present disclosure. In FIG. 4A, the clamp circuit 410 includes a clamp transistor TA. The clamp transistor TA has a first end, a second end and a control end. The first end of the clamp transistor TA is an emitter of the clamp transistor TA, and is coupled to the reference power line PL. The second end of the clamp transistor TA is a collector of the clamp transistor TA, and is coupled to the reference ground GND. The control end of the clamp transistor TA is a base of the clamp transistor TA, and is coupled to the emitter of the clamp transistor TA and the reference power line PL. The clamp transistor TA is a NPN bipolar transistor in this embodiment.

Figure 4B:
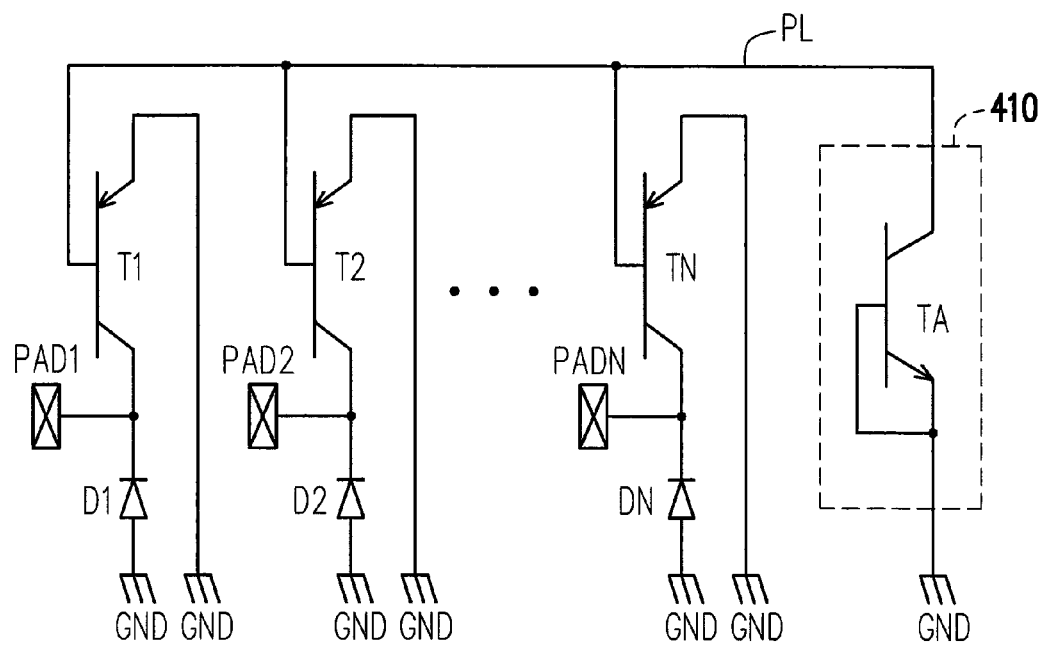

In FIG. 4B, the clamp circuit 410 includes a clamp transistor TA. The clamp transistor TA has a first end, a second end and a control end. The first end of the clamp transistor TA is a collector of the clamp transistor TA, and is coupled to the reference power line PL. The second end of the clamp transistor TA is an emitter of the clamp transistor TA, and is coupled to the reference ground GND. The control end of the clamp transistor TA is a base of the clamp transistor TA, and is coupled to the emitter of the clamp transistor TA and the reference ground GND. The clamp transistor TA is a NPN bipolar transistor in this embodiment.

Figure 4C:
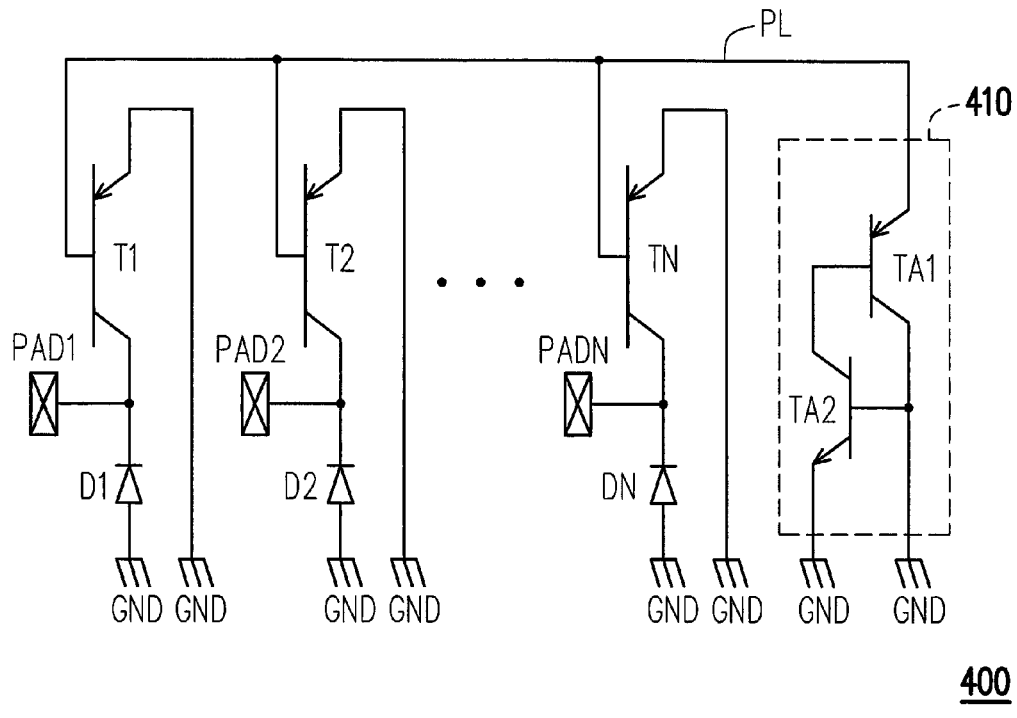

In FIG. 4C, the clamp circuit 410 includes a clamp transistor TA1 and an extra clamp transistor TA2. The clamp transistor TA1 has a first end, a second end and a control end. The first end of the clamp transistor TA is an emitter of the clamp transistor TA1, and is coupled to the reference power line PL. The second end of the clamp transistor TA1 is a collector of the clamp transistor TA1, and is coupled to the reference ground GND. The control end of the clamp transistor TA1 is a base of the clamp transistor TA, and is coupled to the first end of the extra clamp transistor TA2. The first end of the extra clamp transistor TA2 is a collector of the extra clamp transistor TA2. The second end of the clamp transistor TA2 is an emitter of the extra clamp transistor TA2, and is coupled to the reference ground GND. The control end of the extra clamp transistor TA2 is a base of the extra clamp transistor TA2, and is coupled to the collector of the clamp transistor TA1 and the reference ground GND. The clamp transistor TA1 and the extra clamp transistor TA2 form a modified lateral silicon controlled rectifier (MLSCR). In this embodiment, the clamp transistors TA1 and the extra clamp transistor TA2 are bipolar transistors. The clamp transistor TA1 is PNP bipolar transistor, and the extra clamp transistor TA2 is NPN bipolar transistor.

Figure 4D:
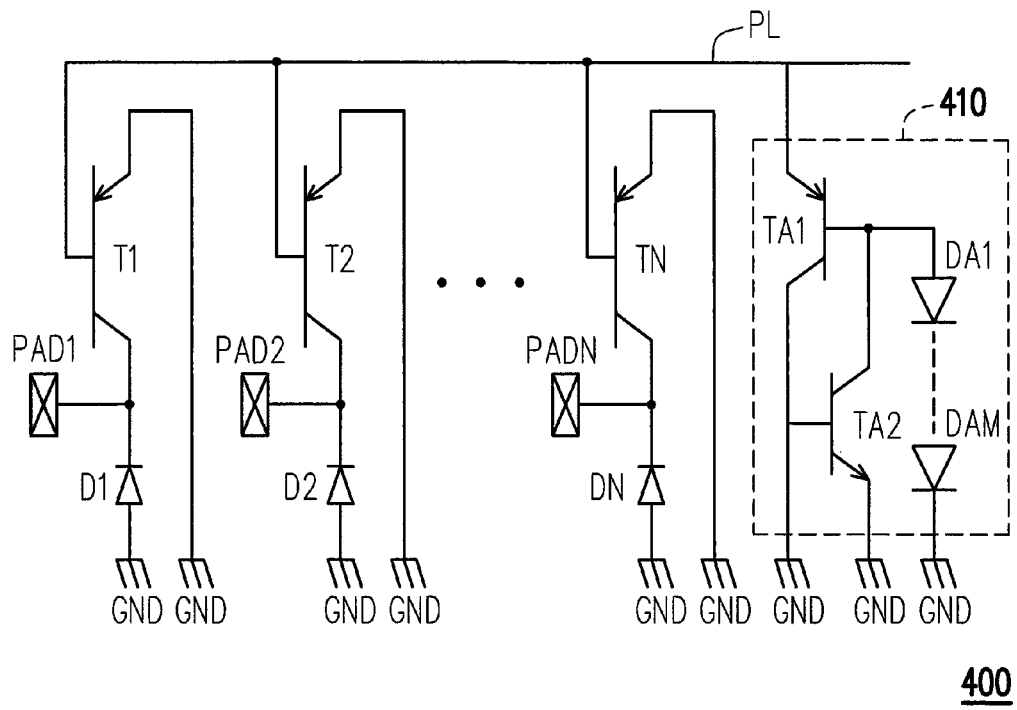

In FIG. 4D, different from FIG. 4C, the clamp circuit 410 further includes at least one clamp diode DA1-DAM. The clamp diodes DA1-DAM are coupled in serial between the base of the clamp transistor TA1 and the reference ground GND, and the clamp diodes DA1-DAM form a diode string. For example, an anode of the clamp diode DA1 is coupled to the base of the clamp transistor TA1, and a cathode of the clamp diode DA1 is coupled to an anode of a clamp diode neighbored to the clamp diode DA1 in the diode string. The clamp circuit 410 formed by the clamp transistor TA1 and the extra clamp transistors TA2, and the clamp diodes DA1-DA2 form a diode trigger silicon controlled rectifier (DTSCR).

Please notice here, the number of the clamp diodes in the diode string is not limited, the diode string may be formed by one or more clamp diodes. Moreover, the number of the clamp diodes may be determined by the voltage level of the operating voltage VPP and a threshold voltage of each of the clamp diode. Moreover, the clamp circuits 2201 and 2301 in FIG. 2B and FIG. 2C may be formed by the clamp circuits 410 described in FIG. 4A-FIG. 4D.

In summary, the present disclosure provides transistors and semiconductor units disposed in a TVS. The transistors are used to release ESD currents from pads to the reference ground, and the semiconductor units are used to release ESD currents from pads to the reference ground GND or the reference power line PL. That is, the TVS can release the ESD currents efficiency for protecting a circuit, and the circuit to be protected can be operated normally.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A transient voltage suppressor, comprising: N first transistors, respectively having N bases which are directly connected to a reference power line, N emitters which are directly connected to a reference ground, and N collectors which are directly connected to N pads respectively, wherein the first transistors are controlled by a voltage on the reference power line; and N semiconductor units, coupled between the reference ground and the N pads respectively, or coupled between the reference power line and the N pads respectively, N is a positive integer;

wherein the semiconductor units are respectively N second transistors, and the second transistors are coupled between the N pads respectively and the reference power line, the second transistors are controlled by the reference ground;

wherein a type of the first transistors and a type of the second transistor are the same, wherein the first transistors and the second transistors are PNP bipolar transistors.

2. The transient voltage suppressor according to claim 1, further comprising:

a power clamp circuit, coupled between the reference power line and the reference ground, wherein, the power clamp circuit drains a current from the reference power line to the reference ground when the transient voltage suppressor is operated in an electrostatic discharge (ESD) protection mode.

3. The transient voltage suppressor according to claim 2, wherein the power clamp circuit comprises:

a clamp transistor, has a first end, a second end and a control end, the first end of the clamp transistor is coupled to the control end of the clamp transistor and the reference power line, the second end of the clamp transistor is coupled to the reference ground.

4. The transient voltage suppressor according to claim 3, wherein the clamp transistor is a NPN bipolar transistor, the first end of the clamp transistor is an emitter of the clamp transistor, the second end of the clamp transistor is a collector of the clamp transistor, and the control end of the clamp transistor is a base of the clamp transistor.

5. The transient voltage suppressor according to claim 3, wherein the power clamp circuit comprises:

a clamp transistor, has a first end, a second end and a control end, the first end of the clamp transistor is coupled to the control end of the clamp transistor and the reference ground, the second end of the clamp transistor is coupled to the reference power line.

6. The transient voltage suppressor according to claim 5, wherein the clamp transistor is a PNP bipolar transistor, the first end of the clamp transistor is an emitter of the clamp transistor, the second end of the clamp transistor is a collector of the clamp transistor, and the control end of the clamp transistor is a base of the clamp transistor.

7. The transient voltage suppressor according to claim 6, wherein the power clamp circuit further comprises:

an extra clamp transistor, coupled between the base and the collector of the clamp transistor, the extra clamp transistor has a first end, a second end and a control end, the first end of the extra clamp transistor is coupled to the control end of the clamp transistor, the control end and the second end of the extra clamp transistor are coupled to the reference ground.

8. The transient voltage suppressor according to claim 7, wherein the extra clamp transistor is a NPN bipolar transistor, the first end of the clamp transistor is a collector of the extra clamp transistor, the second end of the clamp transistor is an emitter of the extra clamp transistor, and the control end of the extra clamp transistor is a base of the extra clamp transistor.

9. The transient voltage suppressor according to claim 7, wherein the power clamp circuit further comprises:

at least one clamp diode, an anode of the clamp diode is coupled to the control end of the clamp transistor, and a cathode of the clamp diode is coupled to the reference ground.

10. The transient voltage suppressor according to claim 1, wherein the pads comprise at least one input output pad and a plurality of power pads.

* * * * *